O. C. MANTEUFEL.
LOOSE LEAF BINDER.
APPLICATION FILED NOV. 23, 1912.
1,221,466.
Patented Apr. 3, 1917.
6 SHEETS—SHEET 6.
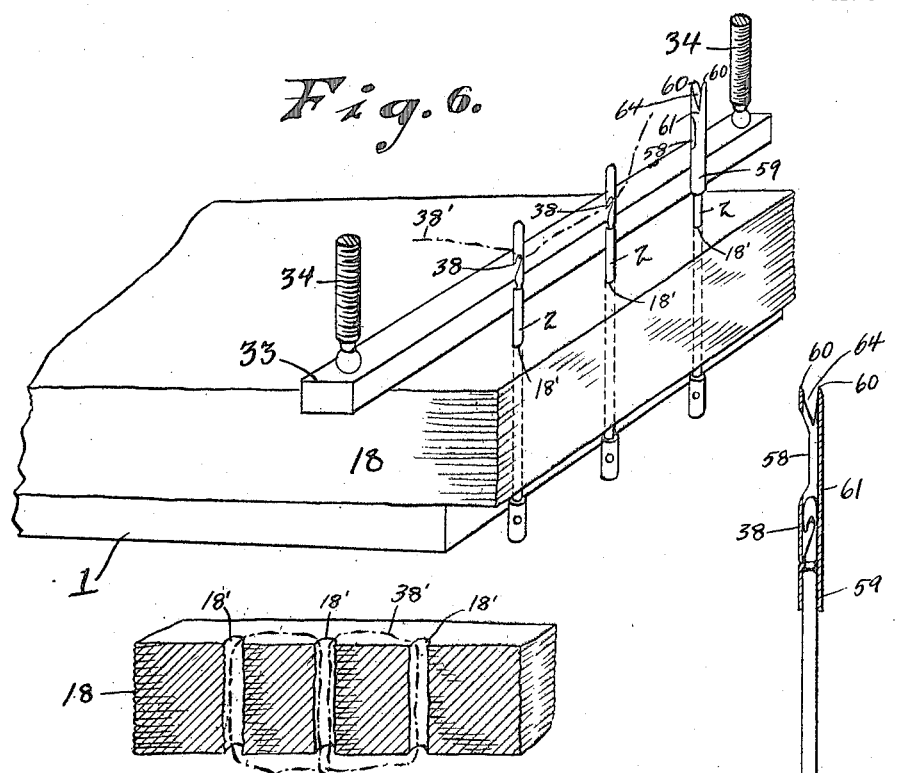
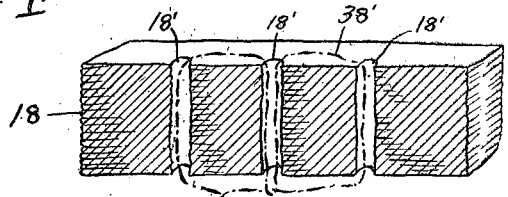
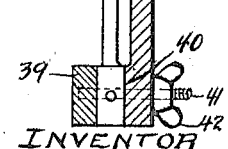

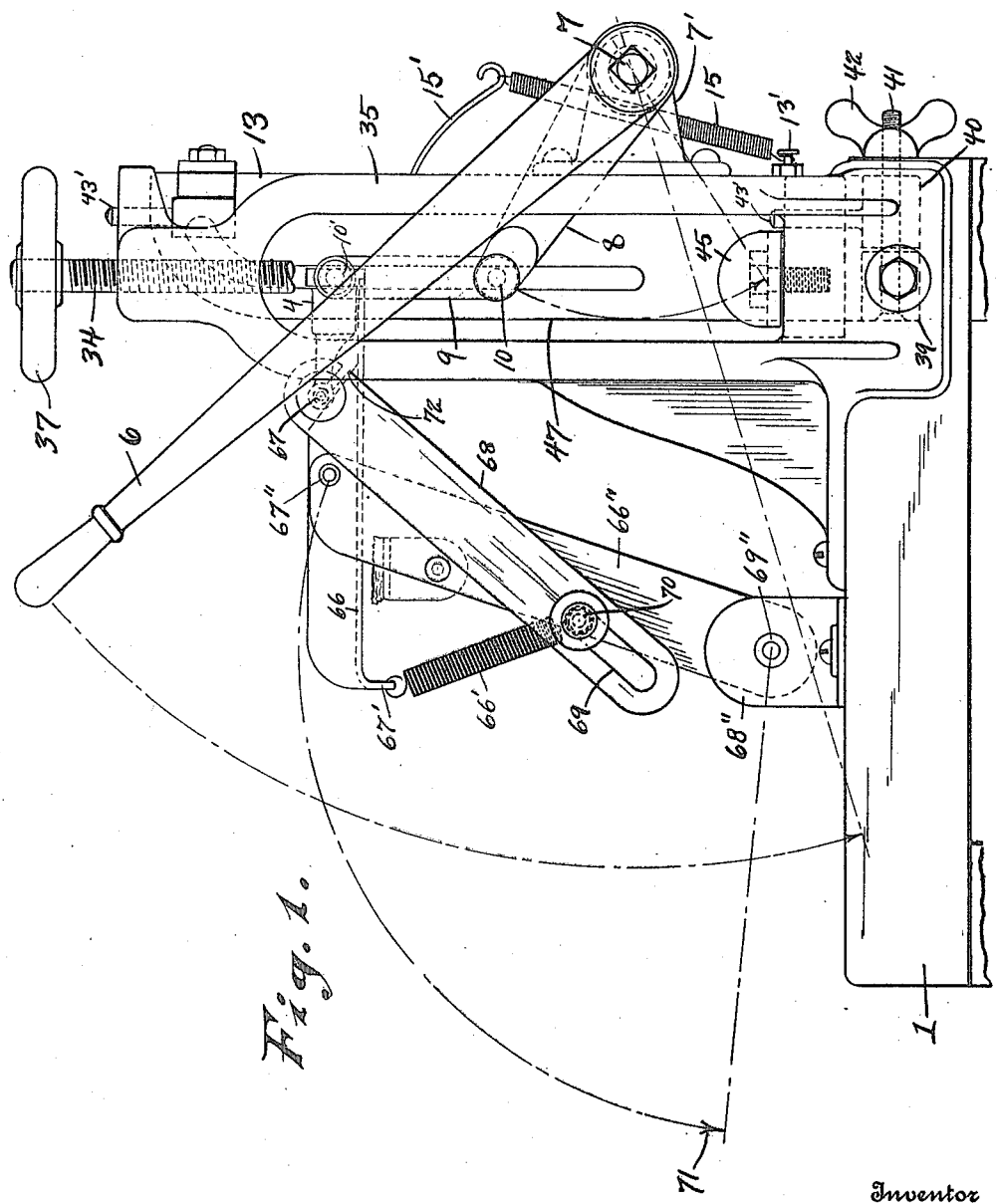

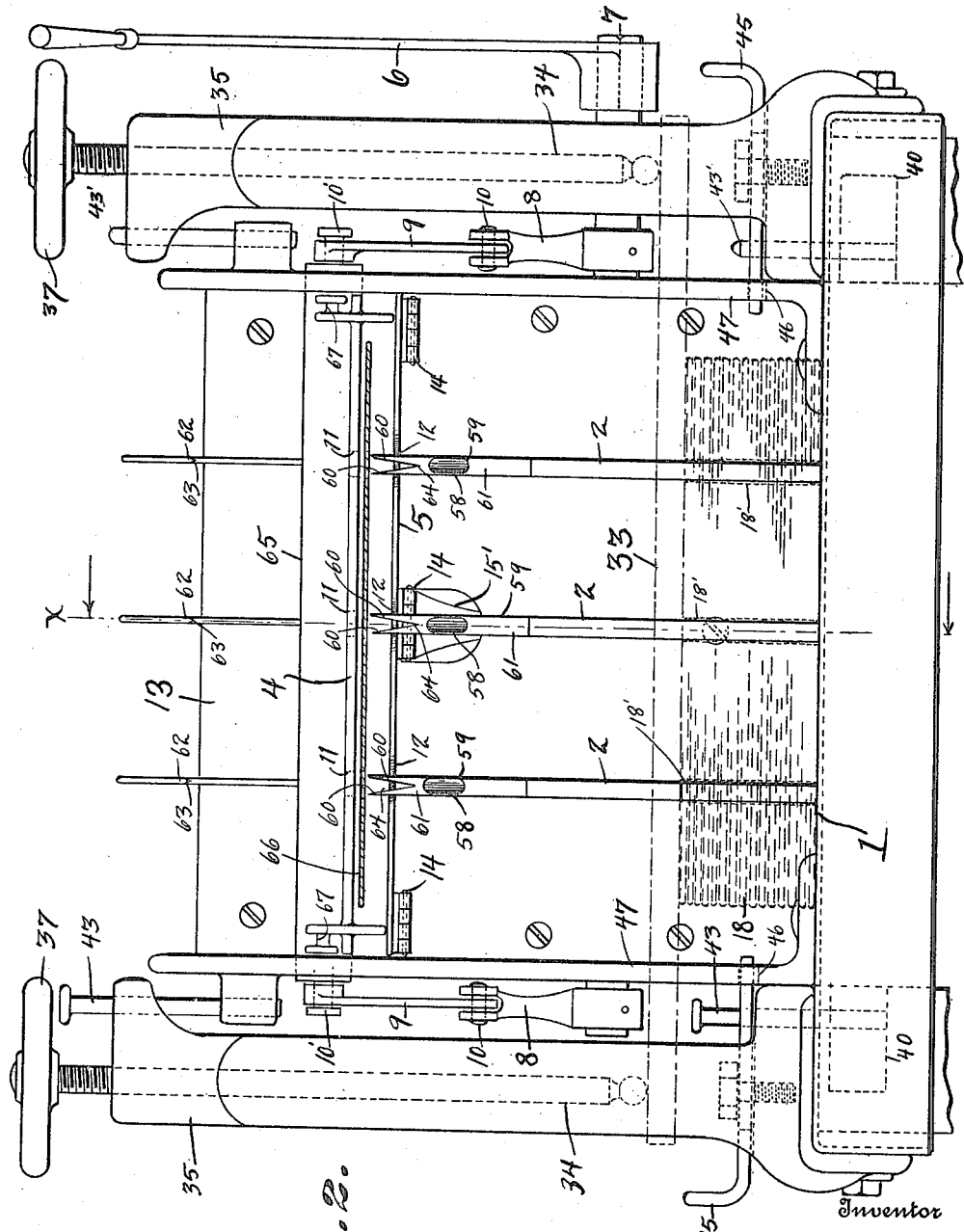

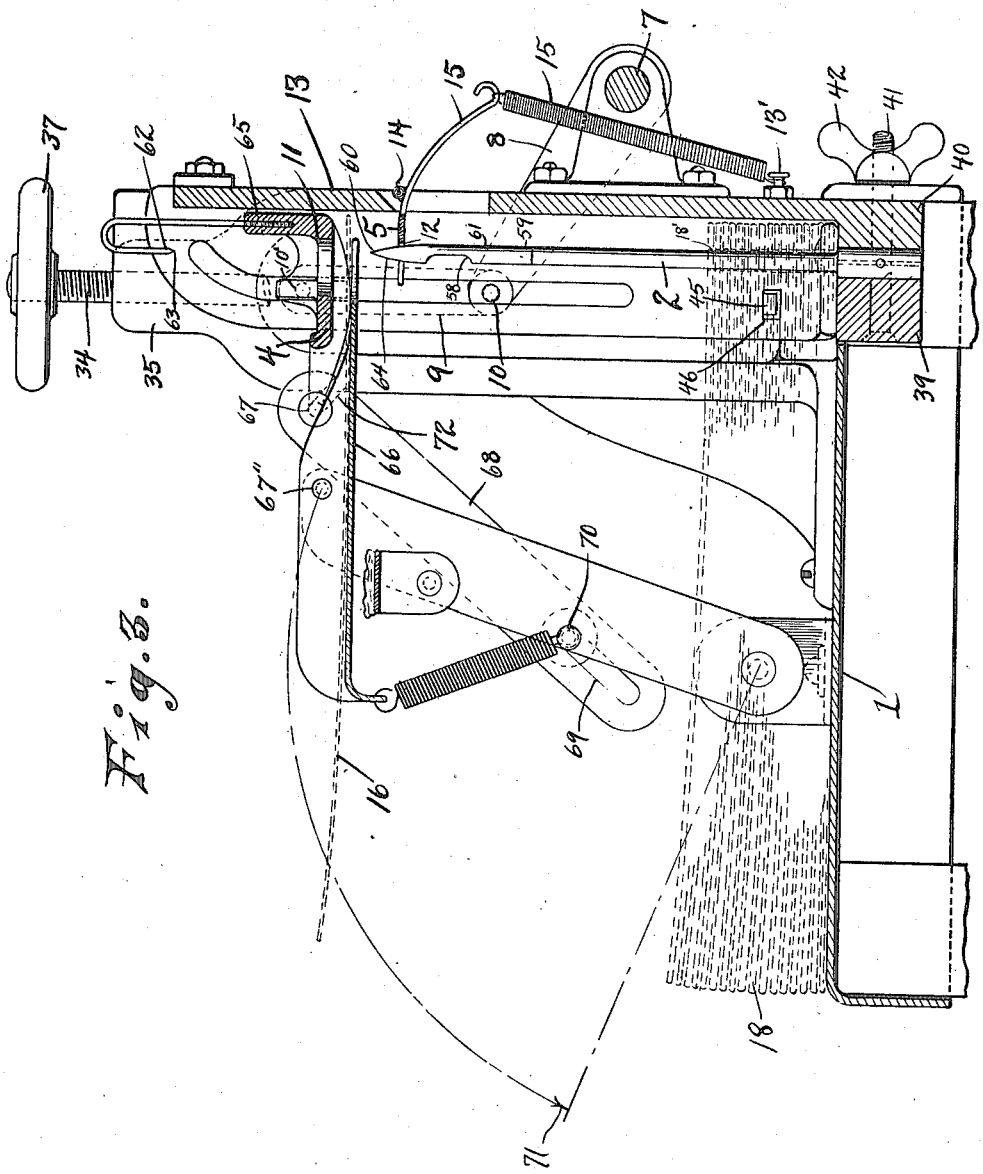

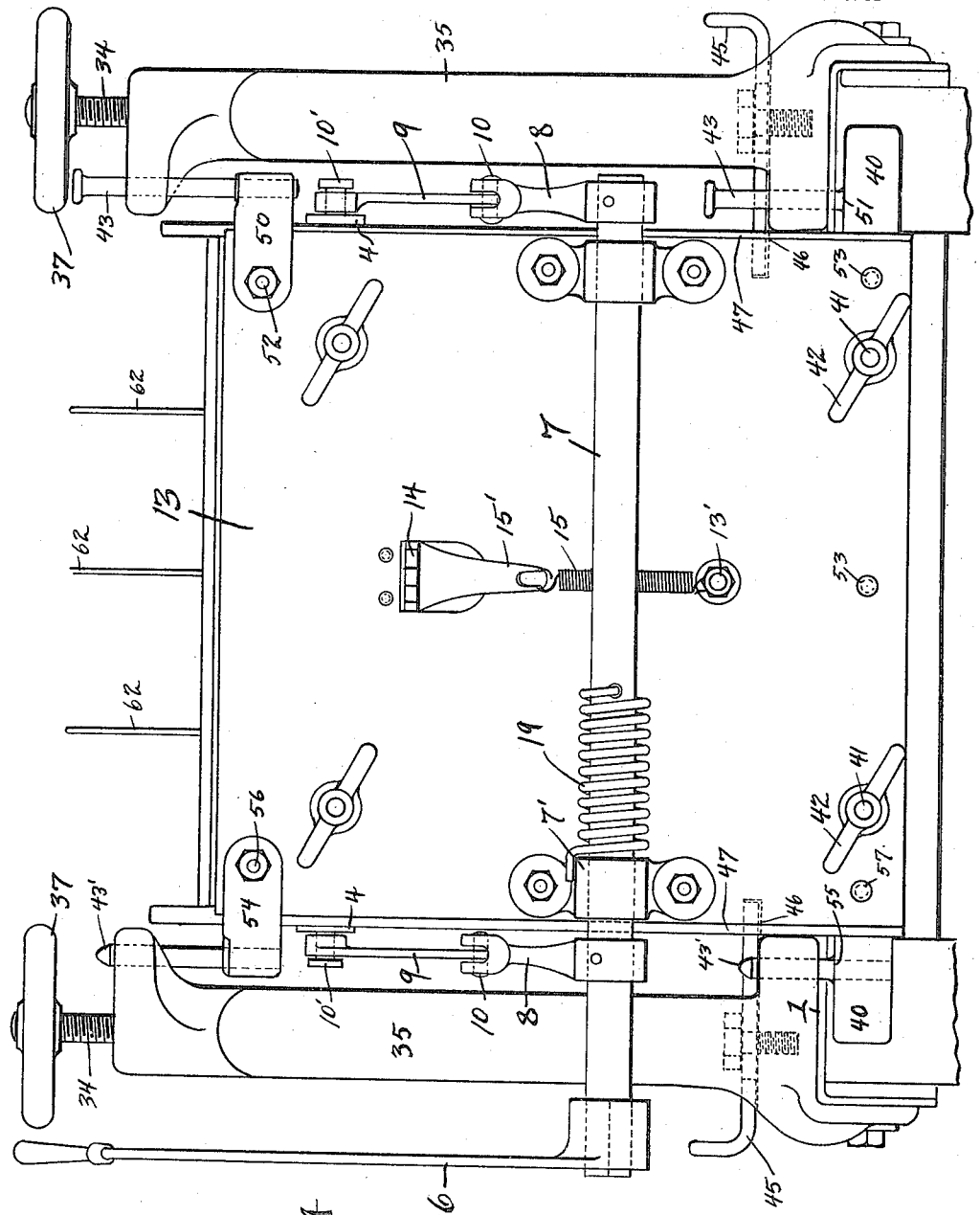

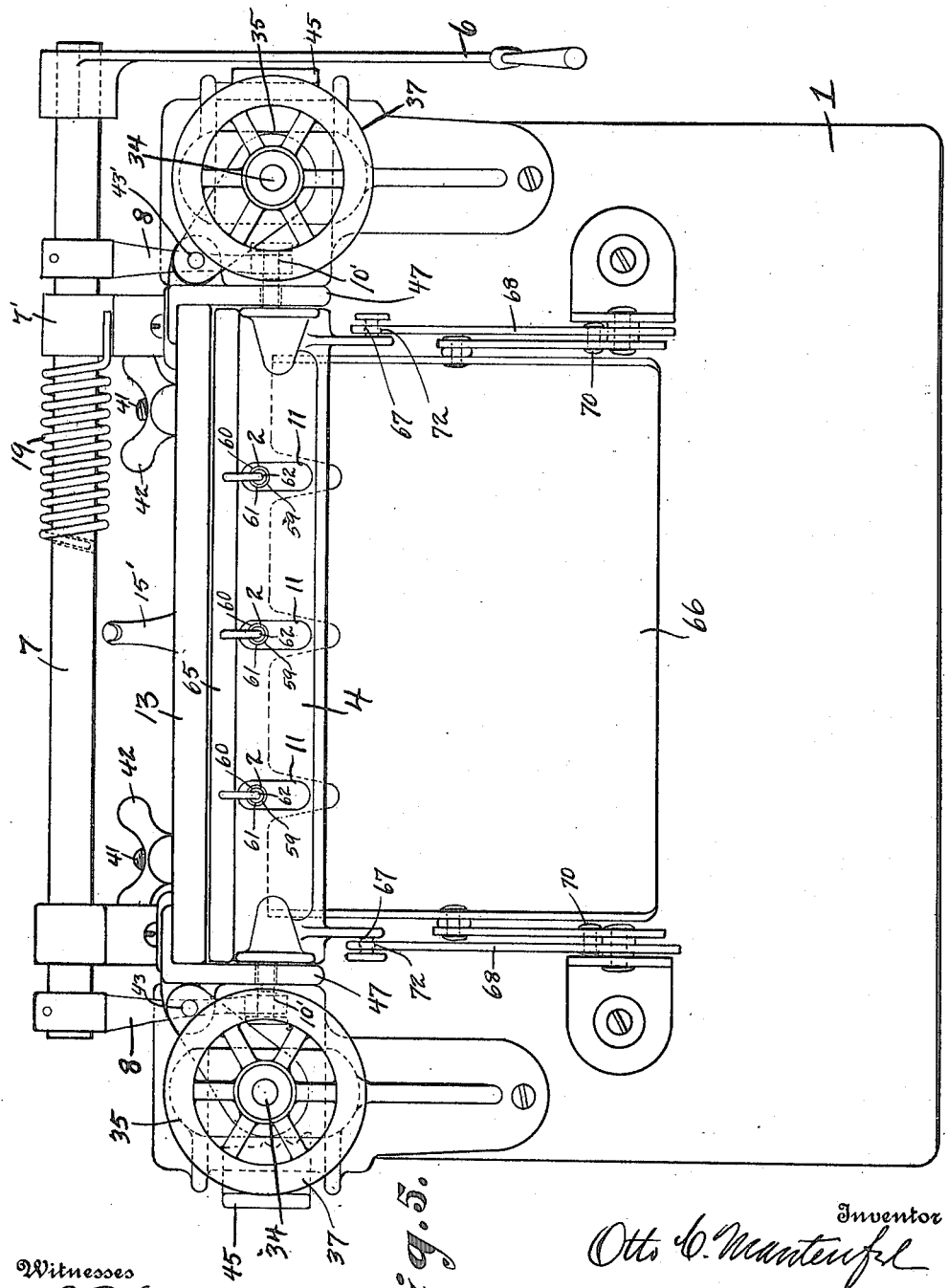

UNITED STATES PATENT OFFICE.

OTTO C. MANTEUFEL, OF MILWAUKEE, WISCONSIN.

LOOSE-LEAF BINDER.

1,221,466.　　　　　Specification of Letters Patent.　　　Patented Apr. 3, 1917.

Application filed November 23, 1912. Serial No. 733,031.

*To all whom it may concern:*

Be it known that I, OTTO C. MANTEUFEL, a citizen of the United States, residing at Milwaukee, county of Milwaukee, and State of Wisconsin, have invented new and useful Improvements in Loose-Leaf Binders, of which the following is a specification.

My invention relates to improvements in loose leaf binders.

The object of my invention is to provide a simple and efficient device for perforating, clamping and binding a plurality of loose leaves together, and my invention is explained by reference to the accompanying drawings, in which—

Figure 1 is an end view thereof.

Fig. 2 is a front view, with the paper supporting platform in section and its operating mechanism removed.

Fig. 3 is a vertical section, drawn on line x—x of Fig. 2.

Fig. 4 is a rear view.

Fig. 5 is a plan view.

Fig. 6 is a perspective view, showing a portion of a bundle of paper, the respective sheets of which are clamped together, preparatory to withdrawing the perforating needles therefrom.

Fig. 7 is a detail view, in section, of a part of the bundle of paper shown in Fig. 6; and Fig. 8 is a side view of one of the needles provided with a cutting head shown in vertical section, and a detail view of the clamping device for holding the needles while the paper is being placed thereon.

Like parts are identified by the same reference numerals throughout the several views.

1 is a base plate, which is provided at its rear side with a series of perforating needles 2, upon which separate sheets of paper, bills, etc. are adapted to be placed from time to time, preparatory to being thereafter bound together, after a sufficient number of such sheets have accumulated. 4 is a pressure bar by which a plurality of sheets are adapted to be pressed down upon the needles 2 at one time, preparatory to being forced upon the base plate 1. 5 is a guide plate by which the upper ends of the needles are retained in alinement with each other as the sheets of paper are being forced upon them. 6 is an operating lever by which the pressure plate is forced down upon the sheets of paper. Motion is communicated from the lever 6 to the pressure plate through the lever supporting shaft 7, arms 8, 8, links 9, 9, link retaining pins 10, 10, and 10', 10', which pins 10', 10', are rigidly affixed to the ends of the pressure plate 4, as shown in Fig. 4.

The pressure plate 4 is provided with a plurality of apertures 11 for the reception of the upper ends of the needles 2, as such plate is forced down upon the paper. The guide plate 5 is provided at its front edge with a plurality of recesses 12 for the reception of the needles. The guide plate 5 is pivotally supported at its center and at each end from the rear wall 13 of the machine upon the hinges 14 and said plate is normally retained in the horizontal position shown in Figs. 2 and 3 by the recoil of the spiral spring 15, which spring is connected at one end with said guide plate through the arm 15' and at its other end to the wall 13 through the pin 13'. As the sheets of paper are being forced, as indicated by dotted lines 16 in Fig. 3, by the action of the pressure plate 4, said needles are prevented from moving laterally by contact with the sides of the recesses 12, as they penetrate the paper, when by the further downward movement of the pressure plate 4, said guide plate will be turned down from the horizontal position to the vertical position, whereby the sheets of paper are free to pass to the base plate 1, as shown in Fig. 3, when the guide plate 5 will be brought back to the horizontal position shown in Fig. 3 by the recoil of the spiral spring 15. When several sheets 16 have been thus forced upon the needles past the guide plate, the operating lever 6 is drawn backwardly by the recoil of the spiral spring 19, one end of said spring 19 being connected with the lever supporting rock shaft 7, while its opposite end is secured to the shaft supporting bracket 7'.

18 represents a bundle of sheets of paper supported upon the base plate 1, preparatory to being bound together. When the required number of sheets have been added to the bundle 18, a temporary binding bar 33 shown in dotted lines in Fig. 2, is placed transversely across the rear end of the bundle directly beneath the lower ends of the binding screws 34, when said binding bar is forced down firmly upon the bundle by said vertical binding screws 34, as shown in Fig. 6. The binding screws 34 are supported from the base 1 by the vertical standards 35, said binding screws having threaded bearings in the upper ends of said vertical standards. 37 is a hand wheel by which the binding screws 34 are operated.

When the sheets of the bundle have been thus compressed together by turning down the binding screws 34 upon the temporary binding bar 33, the series of needles 2 are withdrawn from said sheets as hereinafter described. The several needles 2 of the series are each provided at their upper ends with a hook 38, as shown in Fig. 6, for the reception of a binding cord, indicated by dotted lines 38′, whereby the binding cord which is placed in such hooks as indicated in Fig. 6, is adapted to be drawn down through the perforations in the paper by the act of withdrawing the needles from such perforations, whereby the binding cord is left within the perforations, as indicated by dotted lines in Fig. 7. The several needles 2 of the series are rigidly secured at their lower ends to the rear edge of the base plate 1 by and between the opposing surfaces of the transversely arranged bar 39 and the opposing bar 40 formed on the rear lower edge of the rear wall 13 such bars being secured together by the clamping bolts 41, 41 and wing nuts 42, 42. The members 13, 39, 40, 40, 41, 41, 42 and 42, as shown in Fig. 8 are connected at one end to one of the vertical standards 35 by the hinge bolts 43, 43, and at their opposite ends with the other vertical standard 35 by the vertical pins 43′.

When the desired number of sheets have been thus accumulated and compressed together, as stated, the several wing nuts 42 are turned back upon said bolts 41, whereby said needles are released from binding contact with the opposing surfaces of the bar 39 and bar 40. When this is done, the locking plates 45, which are adapted to engage in the recesses 46 of the vertical side brackets 47, 47, are withdrawn, whereby said brackets 47, together with the rear wall 13 and all the operating mechanism connected therewith, including the operating lever 6, rock shaft 7, members 8, 9, 10, 10′, 4, 5, 13′, 14, 15 and 15′, are allowed to drop away from and out of engaging connection with the lower end of the needles, whereby said needles are permitted to remain in the bundle of papers. By the downward movement of the rear wall 13, the vertical pins 43′ are brought out of engagement with the vertical standard 35 on the left, as shown in Fig. 4, whereby said rear wall 13, together with all of said parts connected therewith, are adapted to be swung rearwardly a quarter of a revolution upon the supporting hinge pins 43, whereby the operator has free access to the rear edge of the bundle of paper, which is left upon the platform 1, as shown in Fig. 6, when the cutting heads 61 are removed from the upper ends of the needles and the binding cord 38′ is passed beneath the hooks 38 of said needles, when the needles are manually withdrawn from the bundle of paper 18, whereby the binding cord is drawn through the perforations 18′ in said bundle as indicated in Fig. 7, when the ends of said binding cord are secured together, whereby the sheets of paper are permanently bound.

The hinge pins 43, 43 are connected with one end of the rear wall 13 by the supporting brackets 40 and 50 and bolts 52 and 53, while the opposite end of said rear wall 13 is temporarily connected with the vertical standard 35 by the brackets 40 and 54, pins 43′, 43′ and bolts 56 and 57. (See Fig. 4.) It will be understood that when forcing the needles 2 through the sheets of paper as they are successively placed thereon, said needles are respectively provided with said cutting heads 61, as shown in Figs. 6 and 8, and that said heads 61 are removably attached to the upper ends of the needles as shown in said Figs. 6 and 8. When, however, the required number of sheets have been placed upon the needles to make a bundle, said cutting heads 61 are manually removed from the tops of the needles, as stated, whereby the hooks 38 are exposed for the reception of the binding cord 38′, when the binding cord is drawn through the perforations, as previously described by manually withdrawing the needles therefrom. The cutting heads 61 comprise a cylindrical member 59, which is adapted to closely fit upon the upper ends of the needles, whereby they are retained in place. Said cutting heads are also provided at their upper ends with cutting edges 60, 60, which are adapted to penetrate the sheets of paper as they are placed thereon, while the side of each cutting head is provided with an aperture 58, through which the waste paper, which is severed from the sheets of paper as such sheets are placed over the cutting heads, is adapted to escape from the cutting heads.

As a means of forcing the refuse paper from the upper ends of the cutting heads 61, I have provided a series of wire hooks 62, the lower ends 63 of which terminate directly above the opening 64 in said heads and are adapted to enter the same as said hooks are drawn down in the act of forcing the paper upon said cutting heads and needles, whereby the refuse paper is forced out through the aperture 58 of said cutting heads. The wire hooks 62 are supported at their lower ends from the rear wall 65 of the pressure plate 4. 66 is a temporary paper supporting platform, which is adapted to support the paper beneath the pressure plate as the several needles 2 are forced through the same. When, however, the sheets of paper have been perforated by the series of needles 2, said temporary paper supporting platform 66 is forced from beneath the sheets of paper in a direction indicated by the arrow 71 in Fig. 3, whereby the sheets of paper are free to pass down upon the bundle 18, as shown in said Fig. 3.

Motion is communicated from the operating lever 6 to the paper supporting platform through shaft 7, arms 8, 8, bolts or rivets 10, 10, links 9, 9, bolts or rivets 10', 10', pressure bar 4, pivotal bolts 67, 67 and links 68, 68, which links 68, 68 are provided at their lower ends with longitudinal slots 69, 69 for the reception of the pins or rivets 70. The pins or rivets 70 also serve to connect the links 68 with the links 66'', as shown in Fig. 5. Thus, it will be obvious that as the operating lever 6 is moved forwardly, the sheets of paper are first forced upon the upper ends of the series of needles 2, when by the further forward movement of said operating lever, said paper supporting platform is withdrawn from beneath the sheets of paper and thrown forward, as indicated by said arrow 71 in Figs. 1 and 3, whereby the paper is free to pass down to the lower end of the needles and rest upon the bundle 18.

It will be understood that preparatory to swinging the rear platform and other cooperating parts upon its supporting hinges, as previously described, it becomes necessary to disengage the upper ends of the link 68 from the pressure plate 4, and to accomplish this object the upper ends of said links are provided with recesses 72 communicating from their lower edges to the openings for the bolts 67, whereby said links are free to be thrown back and disengaged from said pins, whereby the paper supporting platform is entirely disengaged from the rear wall 13 and said rear wall 13 and other coöperating parts are free to be turned back upon their supporting hinges, as previously described.

The paper supporting platform 66 is supported from the base plate 1 at its respective edges by the members 66'' and pivotal bolts 67'', said bolts 67'' passing through the upper ends of said members 66'', and into the side walls of said paper supporting platform near its center.

Having thus described my invention, what I claim as new, and desire to secure by Letters Patent, is—

1. In a loose leaf binder of the described class, the combination of a base plate, a plurality of perforating needles removably secured to said base plate, a paper supporting platform, means for pivotally supporting said platform in a horizontal position on a plane above said perforating needles, means for automatically moving said paper supporting platform away from said needles after the latter have penetrated through the sheets of paper, means for forcing one or more sheets of paper simultaneously upon all of the needles of said series, means for detachably securing a binding cord to the free ends of said needles, and means for releasing the lower ends of said needles from their supporting base, preparatory to withdrawing them from the paper, whereby as such needles are withdrawn, the binding cord is drawn into the perforations preparatory to binding the paper together.

2. In a loose leaf binder of the described class, the combination of a base plate, a plurality of perforating needles removably secured to said base plate, a cutting head attached to the upper end of each of said needles, said cutting heads being provided upon one side with an aperture for the escape of refuse paper, means for forcing one or more sheets of paper simultaneously upon all of said cutting heads, means for automatically removing the refuse paper from said cutting heads as the latter are forced through the sheets of paper, means for retaining the points of said needles and cutting heads in alinement with each other as the paper is being forced thereon, means for detachably securing a binding cord to the free end of said needles, and means for releasing the lower ends of said needles from their supporting base preparatory to withdrawing them from the paper.

3. In a loose leaf binder, the combination of a base plate, a plurality of perforating needles removably secured to said base plate, a paper supporting platform, means for pivotally supporting said platform in a horizontal position on a plane above the perforating needles comprising the two vertical members and two pivotal bolts, which bolts are pivotally connected at their upper ends with the sides of said platform near its center, means for automatically moving said paper supporting platform away from said needles after the latter have penetrated through the sheets of paper, a cutting head attached to the upper ends of each of said needles, said cutting heads being provided upon one side with an aperture for the escape of refuse paper, means for automatically removing the refuse paper from said cutting heads as the latter penetrate the sheets of paper, a pressure plate provided with a plurality of apertures respectively registering with said needles, a rock shaft, an operating lever rigidly connected at one end to one end of said shaft at one end of said machine, means for communicating motion from said rock shaft to said pressure plate and paper supporting platform, whereby as said lever is drawn forwardly the sheets of paper will be simultaneously forced upon the points of all of said cutting heads and said platform will be simultaneously drawn forwardly and away from said needles, means for securing a binding cord to the free ends of said needles, and means for releasing the lower ends of said needles from their supporting base preparatory to withdrawing them from the paper.

In testimony whereof I affix my signature in the presence of two witnesses.

OTTO C. MANTEUFEL.

Witnesses:
 JAS. B. ERWIN,
 IRMA D. BREMER.